June 13, 1967   E. D. PHILLIPS   3,325,143
STRESSED VALVE FOR LABORATORY GLASSWARE
Filed Sept. 25, 1964
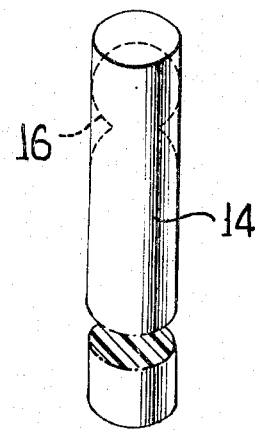
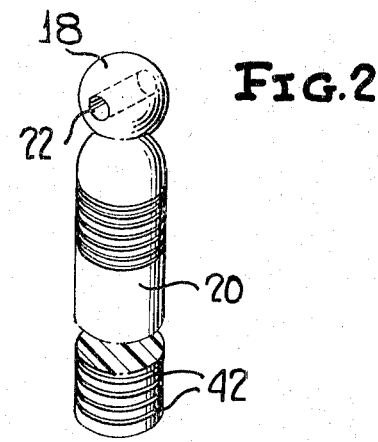
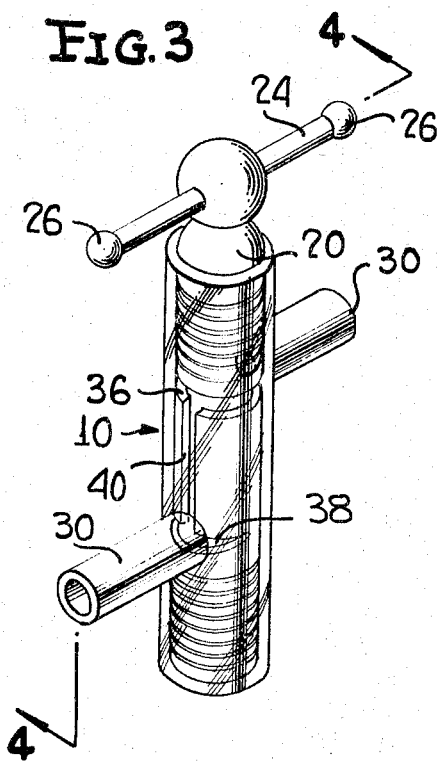
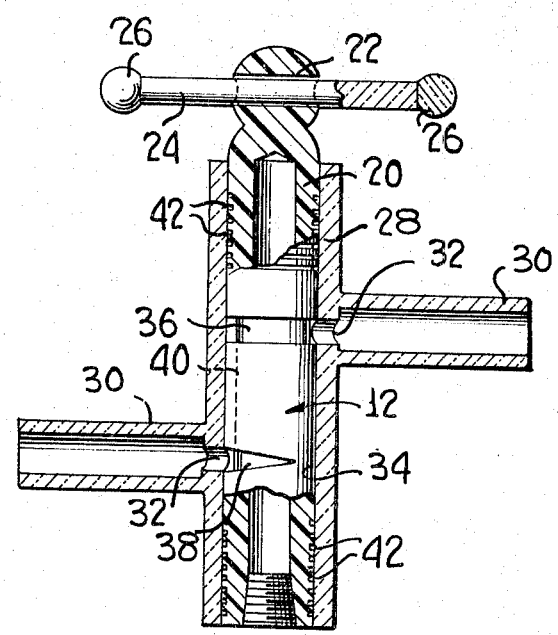
INVENTOR
EDWIN D. PHILLIPS
BY *Shoemaker and Mattare*
ATTORNEYS

United States Patent Office 3,325,143
Patented June 13, 1967

3,325,143
STRESSED VALVE FOR LABORATORY
GLASSWARE
Edwin D. Phillips, P.O. Box 188,
Middlesex, N.J. 08846
Filed Sept. 25, 1964, Ser. No. 399,244
1 Claim. (Cl. 251—311)

This invention relates generally to the class of valves and is directed particularly to improvements in laboratory glassware valves.

In my copending application Ser. No. 287,962, there is disclosed and claimed a novel valve structure designed particularly for use in connection with glass laboratory apparatus.

In that application there is disclosed a novel valve structure embodying a plastic plug in a glass barrel, wherein the plug which is designed to rotate in the barrel, is of constant diameter throughout the length of the portion thereof which fits in the barrel.

As set forth, it is highly important that valves constructed for use in connection with laboratory equipment be so designed as to absolutely leakproof.

Valves have heretofore been constructed in which rotary plugs made of plastic such as Teflon, are employed. These plugs are, however, of the tapered variety and are not entirely satisfactory due to the fact that they are expensive to make, because of the labor involved in making the taper of the stem or plug portion and the sleeve to accurately match. Obviously in using a tapered plug the barrel or sleeve in which the tapered plug is fitted must be very accurately ground so that the surface of the tapered plug will engage tightly against the inner surface of the glass barrel.

The straight cylindrical plug of the copending application referred to is formed in a novel manner whereby it may be inserted into a straight cylindrical barrel and form a tight leakproof engagement with the wall of the barrel.

The present invention is directed to an improved form of the cylindrical plastic plug and has for its principal object to provide such a plastic plug with a novel head or top end construction whereby the operation of inserting the plug into the barrel and withdrawing the plug from the barrel and rotating the plug is greatly facilitated.

Another object of the invention is to provide a novel method of forming the plastic plug and head portion thereof.

A further object of the invention is to provide, a valve structure having a straight cylndrical rotary plug of Teflon or other suitable plastic material, with a head portion embodying a crossbar, preferably of glass or in the form of a length of glass rod, which may be readily grasped for effecting rotation of the plug or for inserting or withdrawing the plug from the encasing barrel.

The invention broadly contemplates the provision of a valve structure having a straight barrel having a straight cylindrical chamber or bore in which is fitted a straight cylindrical rotary plug suitably bored or drilled for permitting the passage of fluid from one port to another in the body of the barrel. The plug is provided with a plurality of relatively fine circumferential grooves, in two spaced groups, in the surface thereof, between which groups of grooves the fluid passing passages are located and such grooves provide circumferential ribs which when the plug is inserted with pressure into the barrel, are placed under tension and form and maintain a firm leakproof engagement with the opposing surface of the bore of the valve.

The plug is formed preferably from a length of rod or dowel of Teflon or other suitable plastic by turning an end portion of the rod, of the desired length, to form a circular or ball head. This ball head is then formed with a radial bore of a diameter to tightly receive a desired length of glass rod and the ends of the length of glass rod are then subjected to a flame treatment to melt the rod and form knobs thereon.

The invention will be best understood from a consideration of the following detailed description taken in connection with the accompanying drawings, wherein:

FIGURE 1 illustrates a portion of a rod of plastic of the desired diameter and showing in dotted lines the form to be given to the end of the rod either by turning or in any other suitable manner.

FIGURE 2 illustrates, in side elevation, the head end portion of the rod shown in FIGURE 1, through which the diametrical bore is formed to receive the crossbar of glass.

FIGURE 3 is a view in perspective of a complete valve structure showing therein the rotary plug of the present invention.

FIGURE 4 is a longitudinal section taken substantially on the line 4—4 of FIGURE 3.

Referring now more particularly to the drawings wherein like numerals of reference designate corresponding parts in several views, the numeral 10 generally designates a valve structure in which the rotary plug, generally designated 12, has a head or top end construction formed in accordance with the present invention.

The valve structure here illustrated corresponds in the barrel design and in the portion of the plug which is encased in the barrel, to one of the several forms illustrated in my copending application hereinabove referred to. Accordingly, it is to be understood that this valve is only illustrative of any number of different valve types in which a rotary plug having a head or top end construction in accordance with the present invention, may be employed.

In accordance with the present invention the plug 12 is fashioned from a cylindrical bar, rod or dowel of Teflon or other suitable plastic material, having the desired diameter for insertion, after turning, into the bore or passage of a length of glass tubing forming the barrel or casing of the valve body.

In FIGURE 1, the numeral 14 designates a portion of the selected plastic rod. This section of the rod is turned in a lathe to the design or contour indicated in dotted lines by the numeral 16. There is thus formed by this turning operation the spherical or ball head 18 which has the same diameter as the body portion of the plug which is inserted into the bore of the barrel.

The body of the plug, as distinguished from the head 18, is designated 20.

The head 18 has formed diametrically therethrough a passage or bore 22.

The numeral 24 designates a length of glass rod which forms a handle or crossbar. This length of glass rod is inserted through the passage 22, the passage being of approximately the same diameter as the rod whereby some pressure is required to insert the rod. The plastic material will, of course, yield to permit the rod to be forced through the bore 22 and will then tend to return to its normal condition, after being slightly deformed by forcing the rod through the bore, so as to maintain a tight grip on the rod.

After the rod 24 has been inserted as described, each end is then subjected to a suitable flame treatment to melt the glass and form a head 26 thereon.

In the type of valve here illustrated the barrel or housing for the plug 12, is designated 28. This barrel is shown as having the two arms or nipples 30 each of which is in communication, by way of the port 32, with the interior or bore 34.

The nipples 30 are shown offset one from the other or misaligned and the body of the plug is provided with suitable fluid conducting passages whereby in one position of rotation of the plug the nipples may be put in communication one with the other and in another rotary position the flow of fluid from one nipple to the other may be completely cut off. In the arrangement here illustrated the body 20 of the plug is provided with an encircling or girdling channel 36 which is in constant connection with one port 32.

In spaced relation with the channel 36, in the longitudinal direction of the plug, the surface of the plug is provided with a second circumferentially directed channel, designated 38. This second channel forms an incomplete circle in that it does not extend entirely around the plug body. Also it tapers from maximum width midway between its ends, to each end and at the point of maximum width it is in communication with a longitudinally extending channel 40 formed in the surface of the plug body.

The second channel 38 is in a plane for communication with the other one of the ports 32. Thus, fluid entering one of the nipples 30, such as the upper one, for example, will flow into the completely circular channel 36 and into the longitudinal channel 40 to the second channel 38 and into and out of the other nipple, if the second channel 38 is in position for some part of it to register with the port 32 of the said other nipple. Rotation of the plug to a position where the portion of the surface thereof lying between the ends of the channel 38 covers the adjacent port 32 will, of course, close the valve against the passage of fluid from one nipple to the other.

In the operation of turning to the length of Teflon rod, a plurality of closely spaced encircling grooves 42 are also formed in the surface of the plug body. The plastic rod from which the plug is formed may initially be slightly oversize with respect to the diameter of the bore 34 of the barrel. Such oversize may be of the order of approximately $10/1000$ of an inch. The grooves are spaced apart about $15/1000$ to $20/1000$ of an inch and are placed in groups of ten or twelve. The oversize of the body would be reduced in the portions outside of the areas in which the grooves are formed. Such reduction would be sufficient to have the body just fit snugly in the bore of the glass barrel or it may reduce the ungrooved areas of the plug to a diameter slightly less than the diameter of the bore of the barrel. Thus, with the areas in which the grooves 42 are formed, being oversize to the extent stated, the material between the grooves, being in the form of narrow ridges would be compressed or distorted in forcing the plug into the barrel and consequently a very tight leakproof engagement would be established between the plug and the wall of the bore of the barrel.

Due to the oversize of the multiplicity of ribs formed between the grooves 42 quite a considerable pressure is required to force the plug into the barrel or to withdraw it and accordingly, it will be seen that by the provision of the novel cross arm head for the plug, a firm hold can be obtained upon the end of the plug to effect its insertion or removal.

As set forth in the pending application hereinbefore referred to, glassware valves constructed in accordance with the present invention have many advantages over valves heretofore produced where the tapered plugs or stems are employed and also where such plugs are formed of a plastic material. As an example, Teflon material can be easily machined to the desired cylindrical form, if the starting material is not initially cylindrical and can be easily machined to form the sealing grooves and ribs and also to form the spherical head here described and such head is easily bored to receive a glass rod as described.

By the employment of the sealing grooves and ribs a tight leakproof valve is obtained and this is accomplished without having to grind the bore of the valve to conform to the shape of the plug as is required where tapered plugs and seats are used.

Another advantage of the valve of the present invention, with respect to the form of the plug and barrel portion thereof is that the plugs or stems of valves of this type are readily interchangeable and even though there may be slight variations in the circularity of the bores of the barrels of different valves, the stems will form the desired leakproof engagement with the barrel bore. Ordinary laboratory tubing, such as would be used for forming the barrel of the present valve structure, or other valves where the barrel would have various different types of nipples or connections, may deviate from an accurate or true circularity, as much as $10/1000$ of an inch. In such case, the formation of the cylindrical plug oversized in the amount stated and in the grooved or ribbed areas will cause the plug to conform to the slight deviation in circularity and still maintain a leakproof connection.

As this invention may be embodied in several forms without departing from the spirit or essential characteristics thereof, the present embodiment is therefore illustrative and not restrictive, since the scope of the invention is defined by the appended claim rather than by the description preceding it, and all changes that fall within the metes and bounds of the claim or that form its functional as well as conjointly cooperative equivalents, are therefore intended to be embraced by that claim.

I claim:

A plug valve comprising a glass barrel having a circular bore and axially spaced inlet and outlet ports, a cylindrical hollow plug in the bore, the bore being of constant diameter in the plug insertion portion thereof, the plug being normally slightly oversize with respect to the diameter of the bore and being formed of Teflon and having a head end projecting beyond the adjacent end of the barrel, said head end having a radial bore therethrough, and a glass rod having a knob on each end secured in said bore of the plug and projecting laterally therefrom for facilitating moving the plug in the barrel, the upper and lower portions of said cylindrical plug having a plurality of closely spaced encircling grooves formed in the surface thereof, whereby sealing ribs are formed between the grooves, the midportion of said plug having longitudinally spaced circumferential grooves and a longitudinal extending connecting groove, providing a connecting passageway between said inlet and outlet ports.

References Cited

UNITED STATES PATENTS

| | | | |
|---|---|---|---|
| 3,012,752 | 12/1961 | Buck | 251—309 |
| 3,124,335 | 3/1964 | Mason | 251—309 X |
| 3,142,474 | 7/1964 | Nelson | 251—309 |

FOREIGN PATENTS

| | | |
|---|---|---|
| 1,275,277 | 9/1961 | France. |
| 1,289,577 | 2/1962 | France. |

M. CARY NELSON, *Primary Examiner.*

EDWARD K. FEIN, *Assistant Examiner.*